Figure 1:
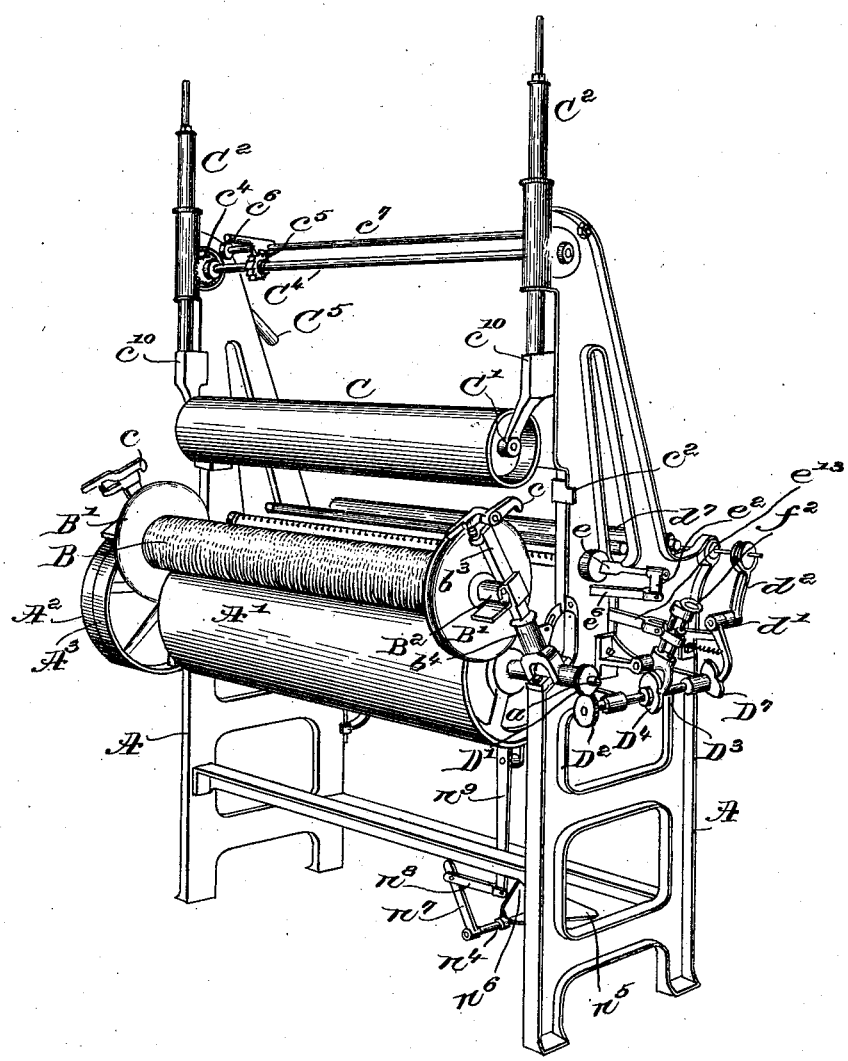

No. 756,014. PATENTED MAR. 29, 1904.
L. O. GOODWIN.
MACHINE FOR WINDING YARN.
APPLICATION FILED JULY 19, 1902.
NO MODEL. 5 SHEETS—SHEET 1.

Witnesses.
Thomas J. Drummond
Herman J. Sartoris

Inventor.
Lyman O. Goodwin,
by Crosby & Gregory
Attys.

No. 756,014. PATENTED MAR. 29, 1904.
L. O. GOODWIN.
MACHINE FOR WINDING YARN.
APPLICATION FILED JULY 19, 1902.
NO MODEL. 5 SHEETS—SHEET 2.
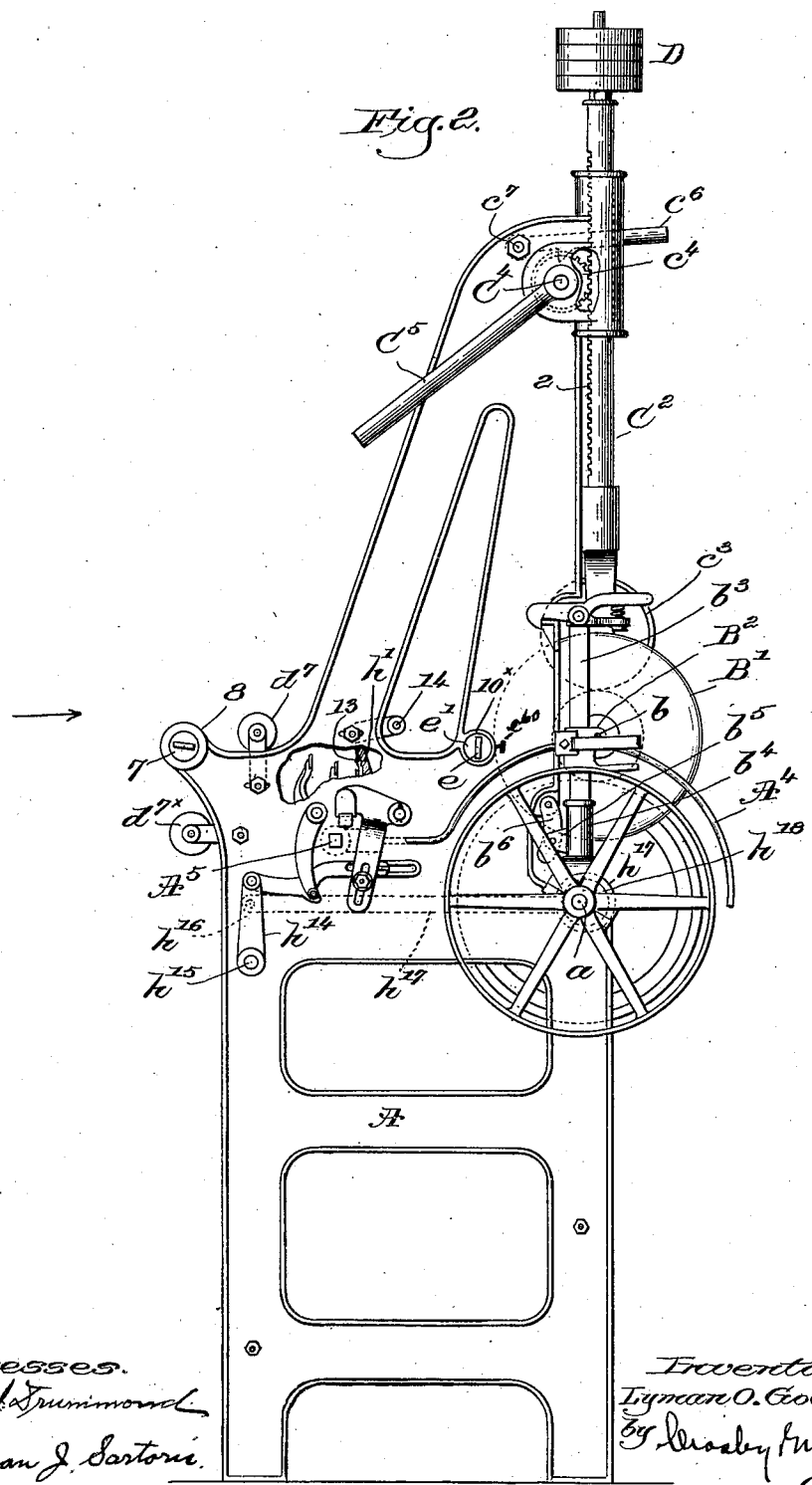

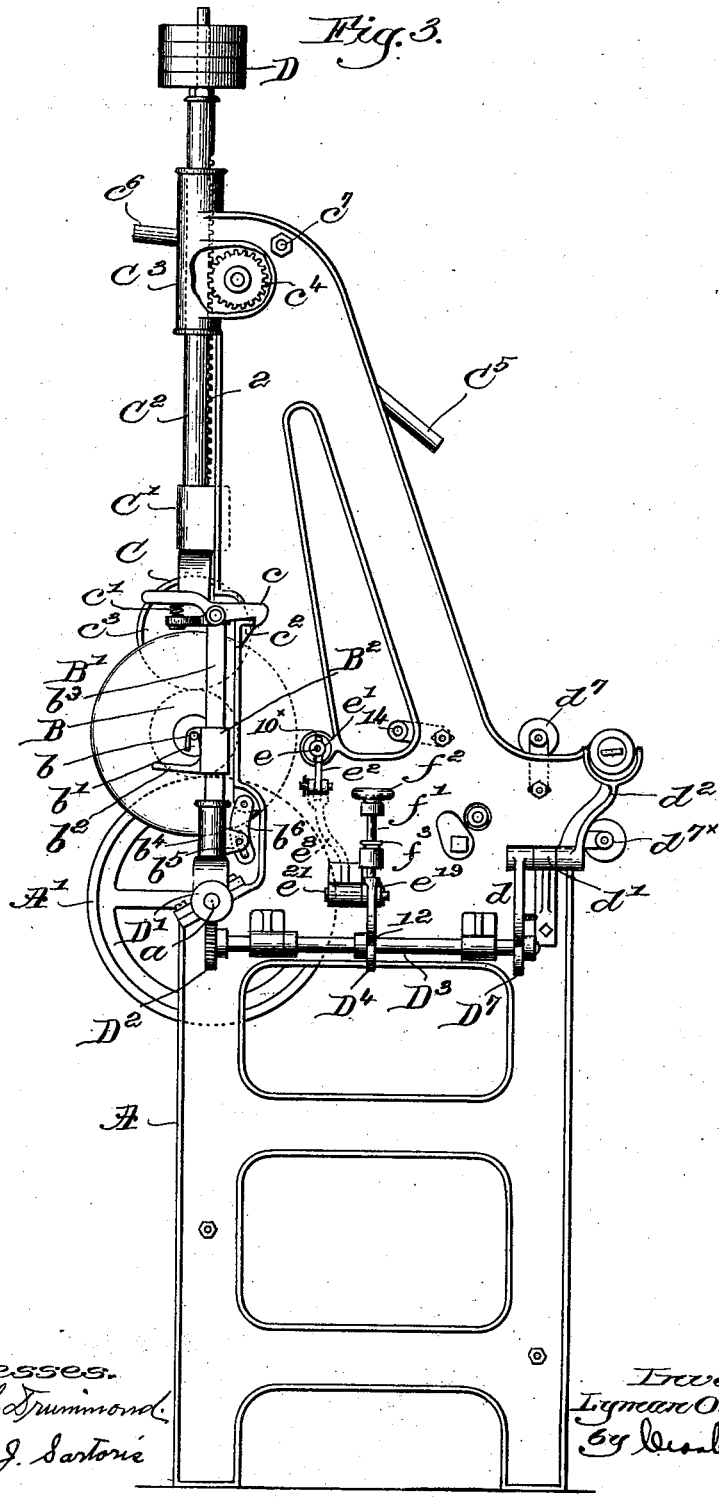

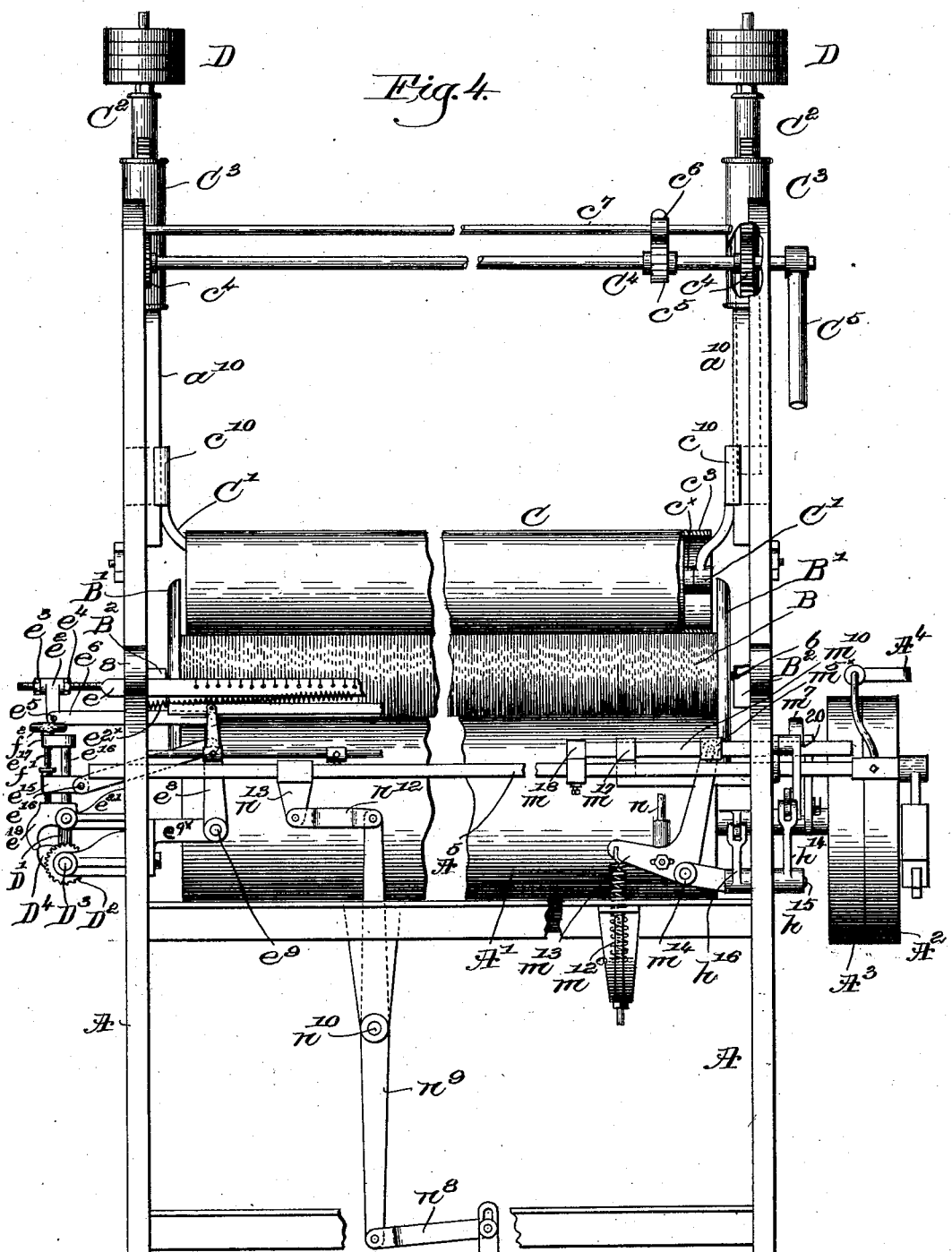

No. 756,014. PATENTED MAR. 29, 1904.
L. O. GOODWIN.
MACHINE FOR WINDING YARN.
APPLICATION FILED JULY 19, 1902.
NO MODEL. 5 SHEETS—SHEET 5.
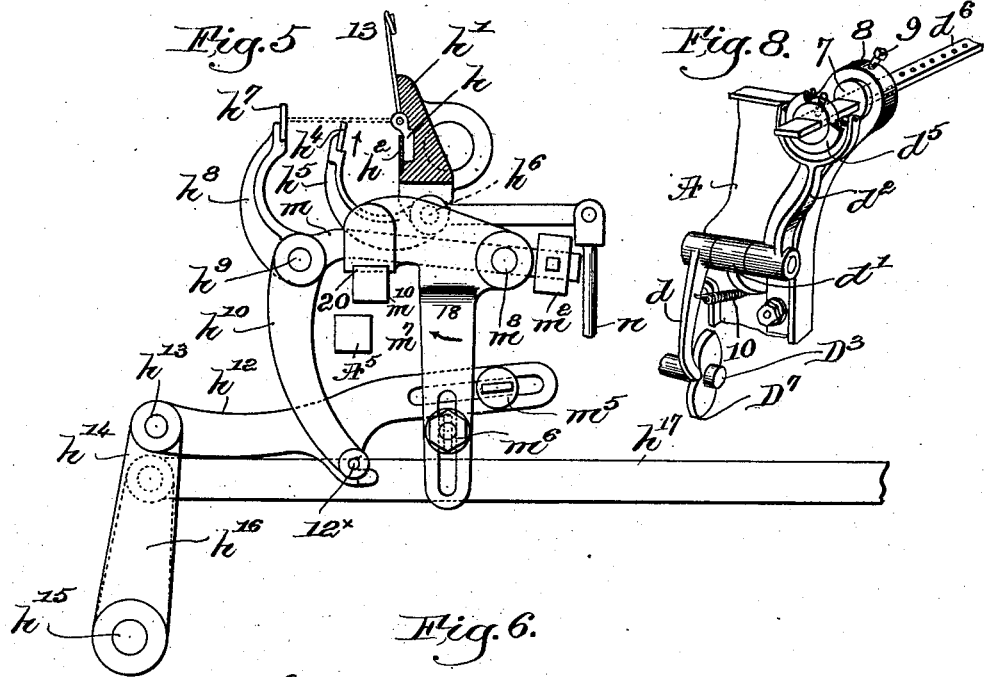
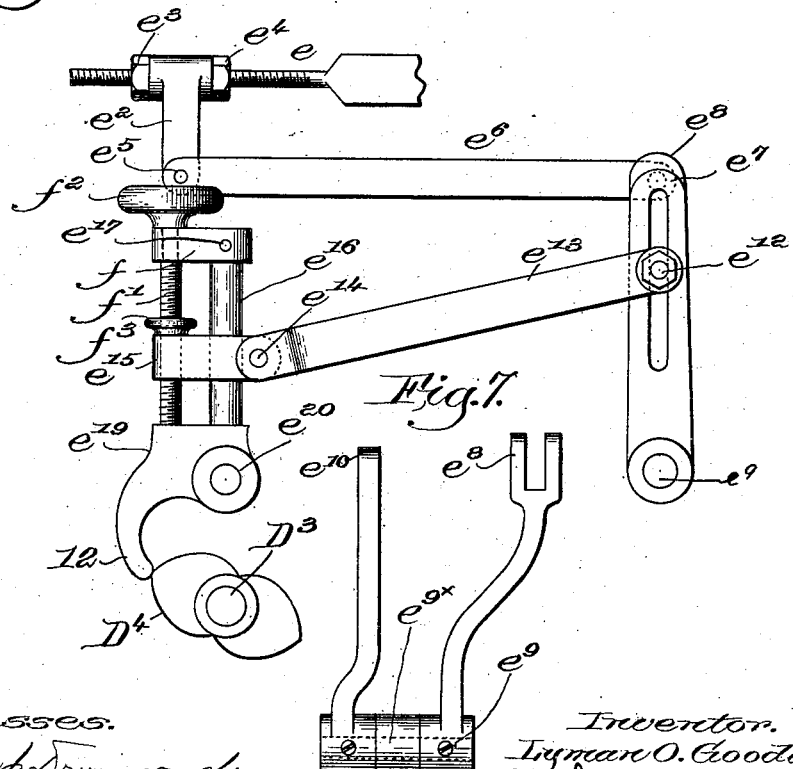
Witnesses.
Thomas J. Drummond.
Herman J. Sartorus.
Inventor.
Lyman O. Goodwin,
by Crosby Gregory.
Attys.

No. 756,014. Patented March 29, 1904.

UNITED STATES PATENT OFFICE.

LYMAN O. GOODWIN, OF NORTH ANDOVER, MASSACHUSETTS, ASSIGNOR TO DAVIS & FURBER MACHINE COMPANY, OF NORTH ANDOVER, MASSACHUSETTS, A CORPORATION OF MASSACHUSETTS.

MACHINE FOR WINDING YARN.

SPECIFICATION forming part of Letters Patent No. 756,014, dated March 29, 1904.

Application filed July 19, 1902. Serial No. 116,272. (No model.)

*To all whom it may concern:*

Be it known that I, LYMAN O. GOODWIN, a citizen of the United States, residing at North Andover, in the county of Essex and State of Massachusetts, have invented an Improvement in Machines for Winding Yarn, of which the following description, in connection with the accompanying drawings, is a specification, like characters on the drawings representing like parts.

This invention has for its object the production of a novel winding-machine of the class used in winding yarns on spools.

One feature of my invention comprises a compression-roller having a gudgeon at each end, said gudgeons being journaled in boxes which are secured to slides fitted to the frame, thus permitting the compression-roller to revolve freely without wabbling in its boxes. The compression-roller sustained in this way will be raised gradually as the spool fills with yarn, and it may be retained at all times in exact working position. The boxes containing the gudgeons of the compression-roller can also be mechanically lifted at any time during the process of winding and also at the completion of winding. The pressure on the compression-roller through the boxes and gudgeons at the ends thereof may be increased as desired without undue wear through the addition of weights arranged at the upper ends of the slides carrying the boxes.

Heretofore compression-rollers have been weighted upon their circumference, and it has been found that the circumference wears unevenly, thus causing the rollers to act unevenly, and it will be obvious that the heavier the weight the greater the wear on that class of rollers.

I prefer to use a plain-surfaced compression-roller; but this invention is not limited in all instances to the use of such a roller only, as I believe that I am the first to sustain a compression-roller by end journals in the manner described.

Another feature of invention herein contained relates to novel movable bearings for sustaining the journals of the spools on which the yarn is being wound. These bearings serve to sustain the spool not only during the winding operation, but also while the operator severs the thread from the full spool preparatory to removing the spool from the machine and also while putting a new spool in position to have the yarn attached to it.

Another feature of invention relates to means for supporting and moving the compression-roller bearing on the yarn being wound and for retaining said roller in an inoperative position while changing spools.

Another feature relates to novel means for providing for varying the stroke of the traverse-guide.

Another feature relates to means for changing at will the relative direction of reciprocation of the front guide and the yarn-guides that lead the yarn into the machine.

Figure 1 is a perspective view of a winding-machine containing my improvements in one of the best forms now known to me. Fig. 2 is a left-hand end view thereof with parts broken away. Fig. 3 is a right-hand end view of the machine shown in Fig. 1. Fig. 4 is a rear elevation looking in the direction of the arrow, Fig. 2, partially broken out to shorten the drawing, some of the parts being omitted. Fig. 5 is an enlarged detail showing part of the machine with the stop-motion wires elevated, the machine being supposed to be running. Fig. 6 is an enlarged detail showing the means for changing the stroke of the traverse-guide. Fig. 7 is a detail of lever $e^8$ $e^{10}$, and Fig. 8 is a detail showing part of the yarn-guide omitted from Fig. 4.

Referring to the drawings, A represents the framework of the machine, it being of suitable shape to sustain the working parts. The framework has bearings to receive the shaft $a$, sustaining the drum $A'$, the latter being covered, preferably, with some rough material to aid in rotating the spool.

The shaft $a$ is provided at one end with a fast pulley $A^2$ and a loose pulley $A^3$, said pulleys being supposed to be driven by a belt under the control of a belt-shipper $A^4$, connected with a shipper-bar $A^5$, sustained in suitable guides of the framework and being adapted to be moved, as will be described, to stop or start the drum.

The drum $A'$ is adapted to sustain and rotate a spool B, having suitable heads $B'$, that embrace the ends of the drum. The journals $b$ of the spool enter slots $b'$ of peculiar bearings $B^2$, having extended therefrom a rest $b^2$, said bearing being shaped to surround loosely and slide on a movable guideway $b^3$, shown as forming part of a casting $b^4$, bifurcated at its lower end and bored to surround the shaft $a$. Each casting $b^4$ has an ear $b^5$, (see Figs. 2 and 3,) with which is connected loosely a slotted link $b^6$, in turn jointed to the framework. The link constitutes a stop to limit the extent of the outward turning or movement of the guideway about the shaft $a$ or from the position shown in Fig. 2 into the position shown in Fig. 1.

The bearings $B^2$ are movable freely on the guideway and slide upwardly thereon during the operation of winding yarn on the spool. The bearings occupy the position Fig. 1 only when the wound spool is to be removed from the machine and while the journals of a new spool are being put in place to enter the bearings.

When the machine is without a spool, the bearings $B^2$ occupy an abnormally low position. In this abnormally low position the rests $b^2$ extend just far enough to permit the operator to place the journals of the spool over the rests, and then by slightly lifting the bearings from their abnormal position the spool-journals may be slid farther along over the said rests until said journals come in line with the slots $b'$, when the bearings will be dropped, causing them to be suspended on the spool-journals. This done, the operator by hand winds the ends of the yarns about the body of the spool and then pushes against the spool, moving it and the guideways $b^3$ in the arc of a circle about the shaft $a$ until suitable locking devices $c$, carried by the upper ends of said guideways and actuated, preferably, by suitable springs $c'$, engage a suitable projection $c^2$, attached to the framework. The locking devices secure the guideways for the bearings in their operative positions throughout the winding of the yarn on the spool, and during this operation the bearings $B^2$ slide upwardly on the guideways until the spool is fully wound.

When a spool is to be removed, as in Fig. 1, the operator will depress the outer ends of the locking devices and disengage them from the projections $c^2$ and then pulling outwardly on the spool thus turn the guideways forwardly. In this forward position the operator has free access to the yarn between the traverse-guide, to be described, and the spool to cut the yarn preparatory to removing the wound spool, and after the cut ends have been caught together in usual manner the operator by hand may lift one bearing $B^2$ after the other and disengage the slots $b'$ thereof from the journals $b$ of the spool, letting the journals pass over the rests $b^2$ and finally leave the machine. This operation greatly lessens the labor of the operator, who has heretofore commonly supported the spool by one knee while severing the threads and getting ready to move a wound spool.

To insure a close and compact winding of the yarns on the spool, I employ a compression-roller C, each end of which is chambered, as represented at $c^3$, Figs. 2 and 4, so that the journals $c^\times$ (see Fig. 4) of said roller occupy a position in said chamber, the ends of the journals not projecting beyond the outer end of the roller.

The journals $c^\times$ of the compression-roller enter suitable bearings $C'$, shown as offset or shaped at their lower ends to enter the chambers $c^3$ at opposite ends of the compression-roller. These bearings are each fixed to the lower end of suitable slide-rods $C^2$ free to be moved longitudinally in guides $C^3$, represented as securing to or forming part of the framework. Each slide-rod is herein supposed to be provided with rack-teeth 2. (See Figs. 2 and 3.)

Each series of teeth is engaged by a pinion $c^4$, fast on a shaft $C^4$, extended across the framework and provided with a suitable handle $C^5$, by which to rotate the shaft $C^2$ whenever it is desired to raise the compression-roller by hand into its inoperative position, as when the wound spool is to be removed.

The compression-roller must be locked in its inoperative position during the removal of the spool, and to provide for this said shaft has fixed to it a ratchet-wheel $c^5$, that may be engaged by a tooth of a hand-lever $c^6$, mounted to turn on a suitable tie-rod $c^7$.

In practice the upper ends of the slide-bars will be provided with a series of weights D—any desired number, that depending upon the degree of compression desired while winding the yarn.

It will be noticed in winding yarn on the spool that the ends of the compression-roller substantially fit the inner sides of the spool-heads and that the periphery of the compression-roll bears on substantially all the threads coming onto the spool to be wound.

Prior to my invention I am not aware that the bearings for a spool have ever been permitted to slide vertically during the winding operation on guideways that might be moved or tipped in such manner as to permit the wound spool to be moved aside from the position occupied by it during the winding, enabling the bearings to sustain the spool mechanically while the operator severs the threads between the traverse-guide and the spool, and this feature I desire to claim broadly irrespective of the construction of the devices employed to secure this result, and so, also, I am not aware that a compression-roller has ever been chambered at its ends that the bearings sustaining the shaft of the compression-roller might be contained within a chamber at the ends of said roller.

The bearings C', sustaining the journals of the compression-roller, as shown in Fig. 4, have lips $c^{10}$, that embrace each a ledge $a^{10}$ of the framework, and said bearings are thus always maintained in a defined path, and it is obvious that any strain that might tend to move the axis of rotation of the compression-roll out of line with or away from its operative position with relation to the driver and spool is obviated.

The shaft $a$ has at one end a worm D', that engages a worm-toothed gear $D^2$, fast on and rotates a cam-shaft $D^3$, sustained in suitable bearings supported by the framework. This shaft has a suitable cam $D^4$ for actuating the traverse mechanism to be described.

The shaft $D^3$ has a second cam $D^7$, shaped the same as cam $D^4$, that acts upon a suitable arm $d$ of a rock-shaft, sustained in a suitable bearing $d'$ on the framework and having a second arm $d^2$ forked at its upper end and provided with pins that enter a suitable annular groove in a collar $d^5$, (see Fig. 8,) secured to a circular block fast to one end of the front thread-guide $d^6$ by a suitable screw, the movement of said lever reciprocating said guide. This thread-guide has suitable holes (see Fig. 8) through which the yarns led from any suitable guides, bobbins, or spools may pass on their way over the front sustaining-roll $d^7$.

The front thread-guide (see Fig. 8) is represented as entering loosely correspondingly-shaped holes in two like circular guide-blocks 7, inclosed by bearings 8, supported by the framework. The blocks may be secured in any adjusted position desired by means of a set-screw 9 engaging the circular exterior of the block, and by rotating the blocks more or less in the bearings 8 the guiding-holes of the thread-guide $d^6$ may be placed at any desired angle, according to the direction from which the yarns to be wound approach said guide.

A suitable spring 10 acts normally to keep the arm $d$ against the cam $D^7$.

The thread-guide $e$, having suitable holes, preferably slotted, into which the yarns to be wound are laid one in each hole, the yarn going from thence onto the spool, is guided in suitable blocks $e'$, secured by suitable set-screws $e^{60}$ in suitable bearings $10^\times$ of the frame, that said blocks may be turned in order to place the guide $e$ in just the desired position.

The left-hand end of the guide (see Fig. 6) has connected loosely with it in suitable manner the hub of an arm $e^2$, said hub being disposed between two suitable nuts, as $e^3$ $e^4$, adapted to be turned on a suitable threaded part of said guide in order to adjust the position of the arm $e^2$ with relation to the end of said guide, this adjustment being desirable to position the guide correctly prior to starting the winding operation.

It is frequently desirable to change the stroke or throw of the thread-guide $e$—that is, to throw it a greater or less distance—or to change the starting or stopping position of the guide to insure proper winding. To provide for this variation in stroke or extent of throw, I have provided the lower end of the arm $e^2$ with a stud $e^5$, over which fits a hole at the end of a link $e^6$, (see Figs. 4 and 6,) in turn jointed at $e^7$ to an arm $e^8$, secured to a rock-shaft $e^9$, held in a suitable bearing $e^{9\times}$ of the framework, said rock-shaft having connected with it a second arm $e^{10}$, represented as slotted to receive a pin $e^{12}$, with which is connected a second link $e^{13}$. The opposite end of the link $e^{13}$ is jointed by a pin $e^{14}$ with a vertically-movable collar $e^{15}$, free to be slid vertically on a guide-rod $e^{16}$, rising from a lever $e^{19}$, having its fulcrum at $e^{20}$ on a suitable bracket $e^{21}$, connected with the framework.

The upper end of the guide-rod $e^{16}$ has pinned to it at $e^{17}$ a block $f$, that receives a screw $f'$, having at its upper end a hand-wheel $f^2$, said screw being mounted loosely in said block $f$, so that it may be rotated and not slid therein.

The threads of the screw $f'$ engage suitable threads of the block $e^{15}$, so that by rotating the screw the block $e^{15}$ may be raised or lowered on the guide-rod $e^{16}$ to secure a longer or shorter stroke or throw of the traverse-bar or to alter the throw in any desired manner of said guide. This adjustment or change of throw may be made by turning the hand-wheel $f^2$ without stopping the machine, and the adjustment having been effected a suitable check-nut $f^3$ may be actuated to restrain any accidental rotation of the screw in the block $e^{15}$. The lower end of the lever $e^{19}$ has a toe 12, that is acted upon by the cam $D^4$, a spring $e^{2\times}$ (see Fig. 4) causing said toe to contact with said cam.

I believe that I am the first to provide any means whatever for adjusting automatically the extent of throw of the traverse-guide without stopping the machine, and I desire to claim this feature broadly irrespective of the particular construction of machine illustrated for effecting such result.

The yarns to be wound are supposed to be passed through suitable holes in the front guide $d^6$ and thence around and under the front guide-roll $d^{7\times}$, thence up and over the guide-roll $d^7$, and thence to and through suitable drop-wires 13, and thence over a roller suitably mounted upon the frame 14, and thence through the holes in the thread-guide, and from there to the spool.

Fig. 5 shows means employed for sustaining the drop-wires and part of their actuating means, and referring to said figure it will be seen that each drop-wire is pivoted on a foot $h$, said feet being inserted in a guideway of a suitable bar $h'$, the feet being retained in said guideway by a plate $h^2$, secured to said bar. The feet are inserted loosely in the guideway of the bar, so that they may move laterally as necessity requires to adapt themselves to the line of the yarn. The bar $h'$ is extended upwardly to act as a stop to arrest the drop-wires sustained by the threads in such a position that in case a yarn breaks the drop-wire will always fall toward the front of the machine, as represented by dotted lines, Fig. 5.

When a thread breaks, the drop-wire is arrested in its down position by means of a suitable bar $h^4$, connected with an arm $h^5$, fast on a rock-shaft $h^6$, and in this position the end of the drop-wire is met by a moving bar $h^7$, connected with suitable arms $h^8$, carried by a rock-shaft $h^9$, said bar being arrested by a drop-wire in its abnormal position and effecting, as will be described, the movement of the shipping mechanism to stop the machine.

The rock-shaft $h^9$ has fast on it an elbow-lever $h^{10}$, provided at one end with a pin $12^\times$, that during the operation of the machine and while all the yarns are whole is engaged by a notch of a lever $h^{12}$, pivoted on a stud $h^{13}$, carried by an arm $h^{14}$, secured to a short rock-shaft $h^{15}$, sustained at but one side of the framework, the opposite end of said rock-shaft (see Fig. 2) having connected with it an arm $h^{16}$, having jointed to its upper end by a suitable pin one end of an eccentric-strap $h^{17}$, the opposite end of said strap embracing an eccentric $h^{18}$ on the drum-shaft $a$.

The arm $m$ of the elbow-lever $h^{10}$ is provided with an adjustable weight $m^2$, having a tendency to keep the pin $12^\times$ in engagement with the notch of the bar $h^{12}$ as the bar $h^{12}$ is moved to and fro by the eccentric-strap $h^{17}$, and so long as the threads are unbroken the arm $h^8$ and the bar $h^7$ will have a uniform movement; but whenever a drop-wire falls into its abnormal position and the movement of the bar $h^7$ is arrested by a drop-wire the arm $h^{12}$ is released from the pin $12^\times$ during the movement of the bar $h^{17}$ to the left, viewing Fig. 5, by the eccentric $h^{18}$ letting the arm $h^{12}$ drop and permitting a dog $m^5$ thereon to engage a similar dog $m^6$, carried by an elbow-lever $m^7$, having its pivot at $m^8$, thus turning said lever in the direction of the arrow 18 thereon, Fig. 5, causing the free end of said lever to retire from a notch 20 in an auxiliary shipper-bar $m^{10}$, parallel with the main shipper-bar $A^5$, and thereafter a spring $m^{12}$, (see Fig. 4,) connected with a rocking lever $m^{13}$, pivoted at $m^{14}$ and slotted at its upper end to engage a pin projecting from a block $m^{5\times}$, connected with said auxiliary shipper-bar to slide said shipper-bar to the left, viewing Fig. 4, causing the end of said bar $m^{10}$ beyond its guide $m^{17}$ to abut a block $m^{18}$, connected with the main shipper-bar and move the latter to the left, transferring the belt from the fast onto the loose pulley, As the lever $m^{13}$ is moved by the spring $m^{12}$ it acts through a link $n$, suitably connected with one end of the arm $h^5$, mounted on the rock-shaft $h^6$, and heretofore described, to turn said rock-shaft and arm $h^5$ upwardly in the direction of the arrow, (shown to the right of it in Fig. 5,) causing the bar $h^4$ to return the drop-wire into its position to receive a mended or pieced thread.

The floor sustaining the machine has suitable bearings, as $n^3$, (see Fig. 4,) to sustain a treadle-shaft $n^4$, provided, as represented, with two treadles $n^5$ $n^6$. The inner end of the treadle-shaft has an arm $n^7$, that is slotted and has connected with it adjustably a link $n^8$, in turn jointed at one end to the lower end of a lever $n^9$, having its fulcrum at $n^{10}$. The upper end of said lever is jointed to a link $n^{12}$, in turn jointed to a block $n^{13}$, fastened to the main shipper-bar.

If the driving-belt is on the loose pulley, the operator may start the machine by putting her foot on the treadle $n^5$, sliding the main shipper-bar to the right and putting the belt on the fast pulley.

As the main shipper-bar is moved to the right to transfer the driving-belt from the loose to the fast pulley the dog $m^{18}$ meets the end of the auxiliary shipper-bar $m^{10}$ and slides the same to the right, enabling the heavier right-hand end of the lever $m^7$ to enter a notch in said bar $m^{10}$, thus locking the shipper in its operative position, (see Fig. 5,) said lever remaining in engagement with said notch until said lever is again moved after the falling of a drop-wire, as before described.

By the branch $n^6$ of the treadle the machine may be stopped, and it may be restarted by the branch $n^5$ of the treadle independent of the stop-motion after once set, and this may be done whenever desired independent of the stop-motion.

In some winding-machines the compression-roll is provided with a series of annular grooves through which the yarn being wound upon the spool is led, but in such construction it will be noticed that the roller does not act directly by its weight or pressure upon the yarn to lay the same tightly onto the spool, and it will also be noticed that the yarn comes upon the spool at the upper side thereof. I consider it of great advantage in closely and solidly winding the yarn upon the spool that the compression-roller act directly upon each yarn as it is being wound upon the spool and that the yarn being wound contacts with the drum at the under side of the spool, and when the annular grooves in the compression-roller are not used I deem it of importance to locate a thread-guide, as $e$, just behind the spool on which the yarn is to be wound, said thread-guide delivering the thread immediately at the point of contact between the drum and the wound yarn of the spool.

It will be noticed that when the thread is guided by grooves in the compression-roll that it is impossible to control the thread and wind it and lay it accurately on the spool up to the flanges; but by using a plain-surfaced roll it is possible to so act upon the threads that they may be guided and laid close to the body of the spool or the yarn mass throughout the entire length of the body of the spool between the spool-heads.

Having described my invention, what I claim, and desire to secure by Letters Patent, is—

1. A winding-machine comprising a spool to receive the yarn, a drum to rotate the spool, bearings to sustain the journals of the spool, and movable guideways sustaining said bearings said guideways being pivotally mounted to swing the bearings carrying the spool from over the drum whereby the wound spool may be moved from its winding position and be sustained while the operator severs the threads prior to the removal of the spool from the machine.

2. A winding-machine comprising a spool to receive the yarn, bearings to sustain the journals of the spool, a drum to rotate the spool, and movable guideways pivotally mounted to turn about the longitudinal axis of the drum prior to removing a wound spool.

3. A winding-machine comprising a spool to receive the yarn, bearings to sustain the journals of the spool, a drum to rotate the spool, and movable guideways pivotally mounted to turn about the longitudinal axis of the drum prior to removing a wound spool, and means to lock said guideways in their operative position for winding the spool.

4. In a winding-machine, a spool, movable guideways, freely-slidable bearings thereon having slots to embrace the journals of the spool, and rests on which said journals may be placed preparatory to inserting the journals of the spool into the slots of the bearing in order that winding may be commenced.

5. In a winding-machine, a drum, a spool to be rotated thereby, and swinging means to position and aid in maintaining the journals of said spool to one side of their winding position and parallel to the longitudinal axis of said drum while the operator wraps the free end of the yarn about the body of the spool.

6. In a winding-machine, a drum, swinging bearing guideways, bearings sustained by said guideways, and shaped to receive and position the journals of an empty spool parallel to the longitudinal axis of said drum preparatory to wrapping the free ends of the yarn about said spool, and means to lock said guideways in operative position when the spool has been placed in winding position with relation to the drum.

7. A winding-machine comprising a drum, a compression-roller, a spool, means to sustain said spool between the drum and compression-roller, said compression-roller having chambered ends, bearings located within the chambered ends of said compression-roller for the journals thereof, and means to raise and lower said bearings.

8. A winding-machine comprising a drum, a compression-roller, a spool, means to sustain said spool between the drum and compression-roller, said compression-roller having chambered ends, bearings located within the chambered ends of said compression-roller for the journals thereof, means to raise and lower said bearings, and means to insure the locking of said bearings and maintain said roller in its inoperative position while changing a filled spool.

9. In a winding-machine, a drum, a compression-roller, means for sustaining a spool between the drum and compression-roller, said compression-roller having chambered ends within which the journals of said roller are contained, parallel slide-rods provided at their lower ends with offset bearings entering the chambers at the ends of said compression-roller, said roller and its bearing being free to enter the space between the spool-heads, thus enabling the compression-roller to contact with all the yarn being wound upon the body of the spool.

10. In a winding-machine, a drum, a compression-roller, means for sustaining a spool between the drum and compression-roller, said compression-roller having chambered ends within which the journals of said roller are contained, parallel slide-rods provided at their lower ends with offset bearings entering the chambers at the ends of said compression-roller, said roller and its bearing being free to enter the space between the spool-heads, thus enabling the compression-roller to contact with all the yarn being wound upon the body of the spool, bearings for said slide-rods, and means to guide the bearings sustaining said compression-roller that the compression-roller may move toward and from the surface of the drum.

11. In a winding-machine, a spool, means to rotate it, a thread-guide having at one end a screw-thread, adjusting-nuts on said thread, a sleeve disposed between said nuts and adjustable as to its position through the adjustment of said nuts, means connected with said sleeve to slide said thread-guide in any adjustment of the nuts and devices for rotatably adjusting the guide.

12. In a winding-machine, a rotatably-adjustable thread-guide, a shaft having a cam, connections between said shaft and guide, and means to adjust said connections without stopping the machine, whereby said cam may actuate said traverse-guide for any desired extent.

13. In a winding-machine, a drum, a spool to receive the yarn to be wound, swing-supports for said spool to enable the latter to be moved into position above or to one side of said drum, a compression-roller having journals at its ends, boxes to receive said journals, and means to guide the boxes as the compression-roller is moved toward and from the axis of rotation of the drum, and means to move said boxes and compression-roller whenever desired independently of the movement derived from increasing yarn on the spool being wound.

14. In a winding-machine, the combination of a drum, a plain-surfaced compression-roller, a spool, movable bearings for said spool, guideways upon which said bearings slide, said guideways being pivotally mounted to swing the spool to position between the drum and compression-roller, or from such position, said bearings being provided with sustaining means for the spool when swung from between the drum and compression-roller.

In testimony whereof I have signed my name to this specification in the presence of two subscribing witnesses.

LYMAN O. GOODWIN.

Witnesses:
GEO. W. GREGORY,
EDITH M. STODDARD.